United States Patent [19]

Wood

[11] Patent Number: 4,513,691
[45] Date of Patent: Apr. 30, 1985

[54] ANIMAL PENS

[76] Inventor: Kenneth E. Wood, Blakeway Farm, Harley, Nr. Shrewsbury, Shropshire, England, SY5 6LT

[21] Appl. No.: 555,132
[22] Filed: Nov. 25, 1983
[51] Int. Cl.³ .............................................. A61D 3/00
[52] U.S. Cl. ..................................................... 119/99
[58] Field of Search ..................... 119/99, 98, 96, 103, 119/101

[56] References Cited

U.S. PATENT DOCUMENTS

| 882,647 | 3/1908 | Nelson | 119/99 |
|---|---|---|---|
| 2,672,126 | 3/1954 | Linton | 119/100 |
| 2,995,111 | 8/1961 | Darden | 119/99 |
| 3,319,608 | 5/1967 | Klooster | 119/98 |
| 4,116,166 | 9/1978 | Gofflot | 119/99 |

Primary Examiner—Robert P. Swiatek
Assistant Examiner—Kris R. Schulze
Attorney, Agent, or Firm—Clifford A. Poff; Thomas H. Murray

[57] ABSTRACT

An animal pen comprises a plurality of frame members interconnected to provide an animal receiving structure having a front end and a rear end, a door adjacent the rear end for entry of the animal head first into the pen, an advancing means mounted on the main frame for movement forwardly of the frame to engage the rear of the animal to urge the animal forwardly in the structure, a first hydraulic ram to actuate the advancing means mounted between the advancing means and the main frame, and a yoke comprising a pair of closure members mounted in the frame for movement forwardly and inwardly of the frame to close around a front of the animal, and a linkage between the closure members, a second hydraulic ram between the linkage and the main frame to actuate the closure members.

6 Claims, 2 Drawing Figures

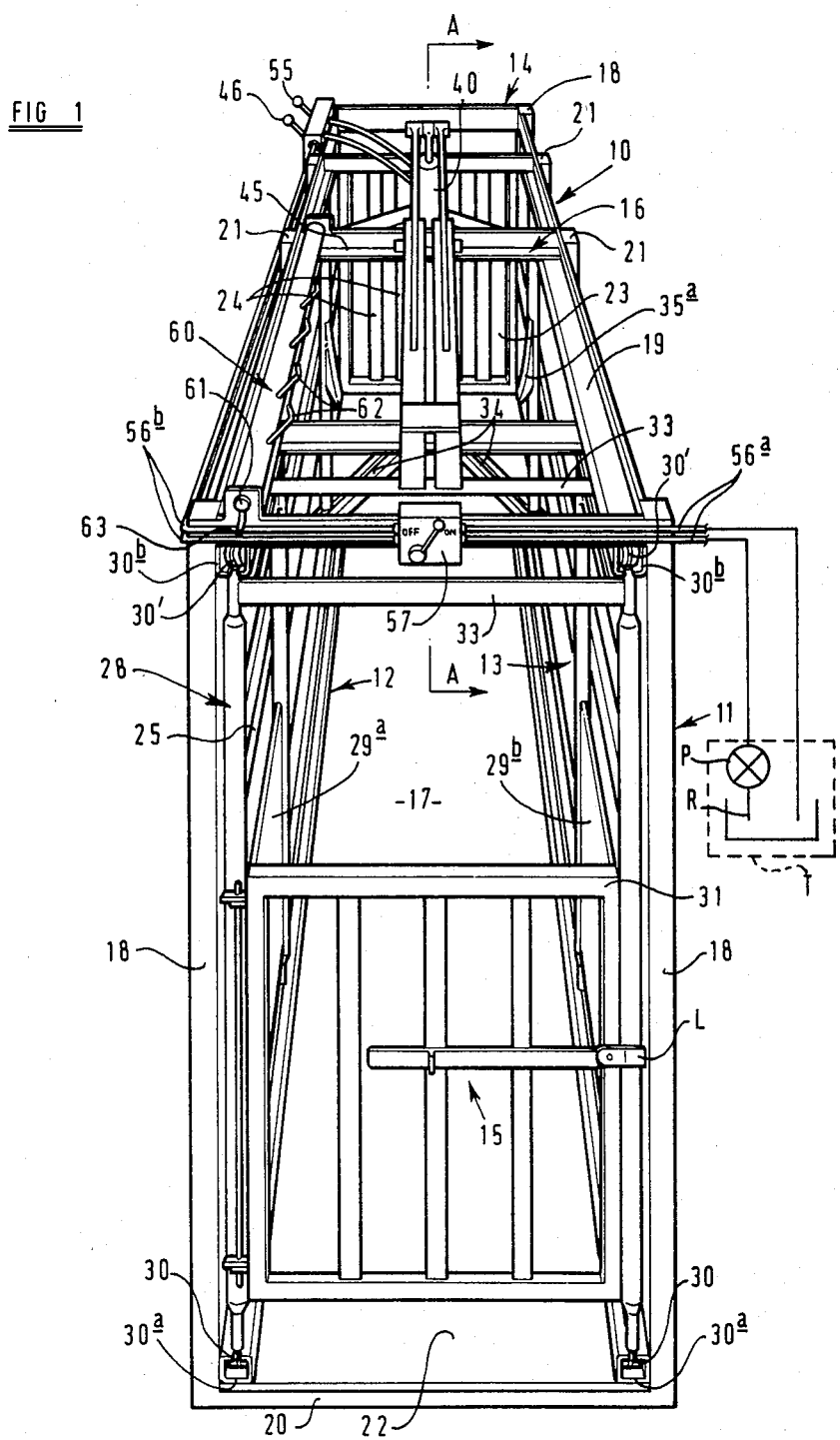

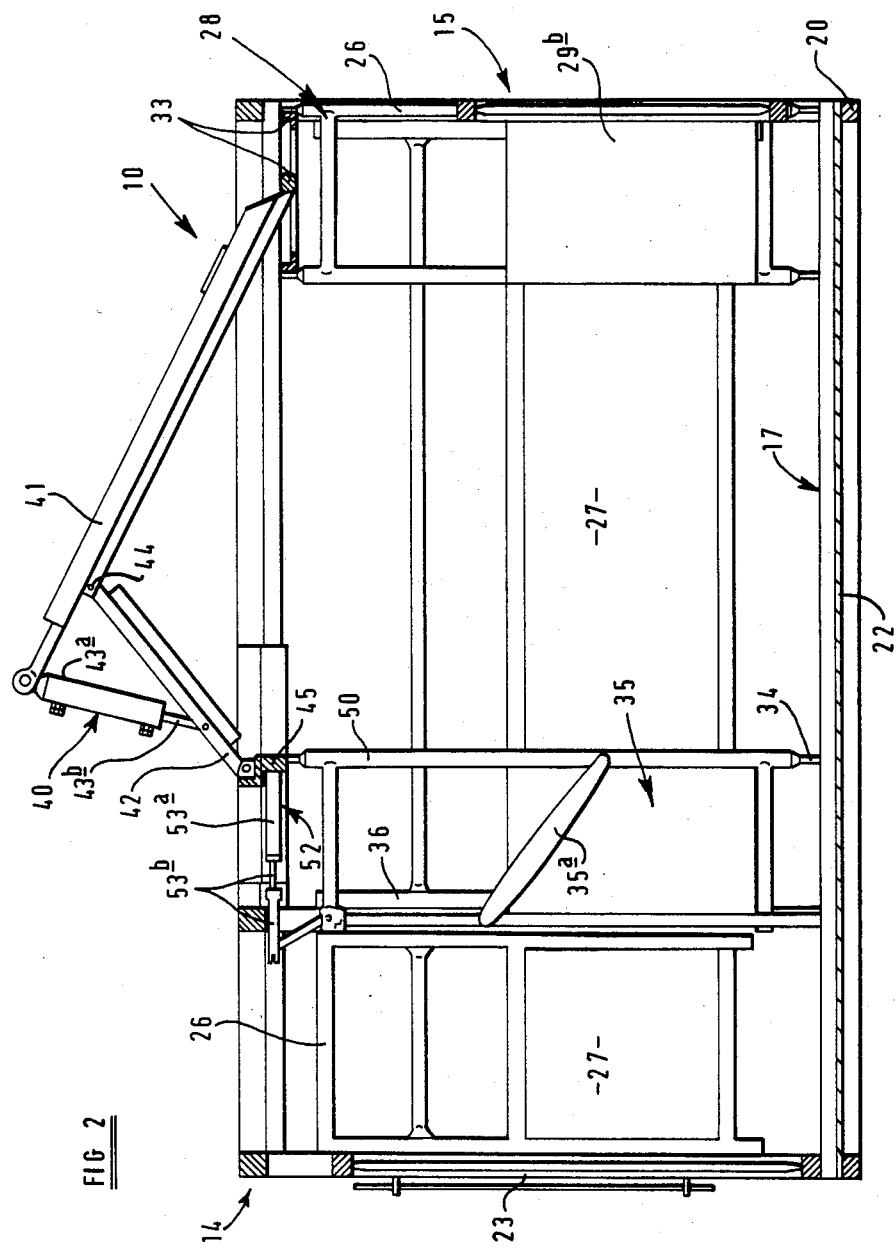

ANIMAL PENS

BACKGROUND OF THE INVENTION

1. Field of the Invention

This invention relates to a pen for use in restraining an animal such as a cow or other bovine animal whilst an operation is carried out on the animal which requires the animal to be held as still as possible, such as a dental or other veterinary inspection, or treatment such as the giving of an injection.

2. Prior Art

Such a pen is known commonly as a cattle crush and comprises a generally elongate box-like frame structure having a lateral dimension just sufficient to receive the animal, a yoke at one end to receive the animal's head, and a door or gate at the other end through which the animal can enter the pen. The pen is longer than the animal and once the animal is in the pen, manual advancing means are actuated to cause a transverse bar to engage the hind quarters of the animal to urge the animal forward until its head is in engagement with the yoke.

The yoke engages the animal's head closely to minimise movement of the head and because the lateral dimensions of the pen are only just sufficient to receive the animal, side to side movement of the animal is also minimised. Of course the animal cannot move rearwardly because of the transverse bar.

This prior construction is described in U.K. Specification No. 1,483,347 wherein a manual mechanism for actuating the advancing means with a mechanical advantage, is provided to enable the advancing means to be actuated single handedly.

However the prior construction has at least the following two disadvantages.

First, even with the mechanical advantage mechanism described in U.K. Specification No. 1,483,347, manual operation of the advancing means is difficult, particularly where the animal becomes distressed and objects to being restrained.

Secondly, because the yoke has been in front of the animal, the animal can see the yoke as it is urged forwardly by the advancing means and thus the animal is even more likely to become distressed and object, thus increasing the difficulty of operating the advancing means.

SUMMARY OF THE INVENTION

Accordingly, it is an object of the present invention to provide a new or improved animal pen which overcomes or reduces these problems.

According to one aspect of the invention, we provide an animal pen comprising an animal receiving structure having door means adjacent the rear end of the structure to enable the animal to enter the pen, first fluid operated power means to actuate an advancing means which is adapted to engage the rear of the animal to urge the animal forwardly in the structure, second fluid operated power means to actuate yoke means which are adapted to close around a front part of the animal.

For example, the yoke means may be adapted to close around the neck of the animal to restrain the head from movement, but may if desired engage another front part such as behind the front shoulders of the animal but in this event the animal would be permitted greater head movement.

The door means may comprise a part of the advancing means which engages the rear of the animal when actuated which advancing means may be carried on tracks within the structure. Alternatively, the door means may comprise an opening in the structure and a transverse bar or other member connected to the advancing means after the animal has entered the pen, which transverse bar is adapted to engage the rear of the animal.

The animal receiving structure may comprise a framework of elongate members connected together to provide various openings through which an operation may be carried out on the animal, although a part or parts of the structure may be closed by a panel or panels engaged with the framework, if desired.

The first fluid operated power means may act between a fixed part of the structure, such as a part of the framework, and the advancing means, and may comprise a double-acting hydraulic ram.

The yoke means may comprise a pair of closure members, also carried on tracks within the structure, which, when the second fluid operated means is operated, move together to close around the front part of the animal.

Preferably, the tracks for the closure members extend inwardly and forwardly within the structure so that the animal may be urged forwardly by the advancing means so that the head of the animal is in front of the closure members whereby the closure members may be closed around the neck of the animal, from behind. The animal is thus not able to see the yoke means as it is advanced but only becomes aware of the yoke means as the closure members close around the animal's neck.

Thus the distress to the animal is considerably reduced compared to the construction described in U.K. Specification No. 1,483,347.

The closure members of the yoke means may be actuated by a single hydraulic ram through a link means, although if required a pair of such rams may be provided one for each closure member.

Although the animal receiving structure may comprise a framework through openings in which the operation may be carried out on the animal restrained therein, in some cases it may be desirable for greater access to be gained to the animal.

Thus side doors may be provided which may be opened to enable an operation to be carried for example out on the sides or legs of an animal. For example a side door may be provided on each side of the structure, one towards the front and one towards the back of each side. Further, a front door may be provided to enable access to be gained direct to the animal's head.

It will be appreciated that when the animal is restrained by the yoke means and the advancing means, that such side doors when opened would not allow the animal to make any great movement in the structure and thus the animal remains restrained.

The pen may have a complete hydraulic system including hydraulic rams, control valves, and a pump and hydraulic reservoir, although preferably the pump and hydraulic reservoir are separate and the rams and control valves of the pen are connected to the pump and reservoir by pressure hoses. For example, the hydraulic rams of the pen may be operated using a tractor unit such as are commonly used on farms, to which the pen has obvious application.

If desired, the pen may include means to lift the animal or a part of the animal such as a leg thereof, which means may be manually or power operated.

According to a second aspect of the invention we provide a method of restraining an animal comprising the steps of causing the animal to enter an animal pen according to the first aspect of the invention, through a rear door thereof, actuating the advancing means to urge the animal forwardly in the structure actuating the yoke means to close around a front part of the animal.

BRIEF DESCRIPTION OF THE DRAWINGS

The invention will now be described with the aid of the accompanying drawings wherein FIG. 1 is a front perspective illustration of an animal pen in accordance with the invention;

FIG. 2 is a side sectional view of the pen taken on the lines A—A of FIG. 1.

DESCRIPTION OF THE PREFERRED EMBODIMENTS

Referring to the drawings, an animal pen 10 comprises an animal receiving structure and comprises a main framework 11 of elongate members welded together to provide two sides 12, 13, a front end 14, a rear end 15, a top 16 and parts of a floor structure 17.

The framework comprises four main corner posts 18, a roof frame 19, and a floor frame 20, the sides 12, 13 of the structure having intermediate main vertical members 21, as well as a plurality of horizontally and vertically extending members, to complete the framework 11.

Carried on the floor frame 20, which in use rests on the ground, is a timber decking 22.

The front end 14 of the structure is closed by a door 23 made of a sub-framework of elongate members 24.

The sides 12, 13 each have A door 25, 26 respectively of similar construction to door 23, but each being closed at the lower half by a metal panel 27, one door 25 being towards the rear end 15 of side 12 of the structure and the other door 26, towards the front end 14 of side 13.

In another preferred embodiment, each side has two doors, one towards the front and one towards the rear of the structure.

The rear end 15 of the structure has a door opening in which a sub-frame 28 of an advancing means is received.

The advancing means comprises two side parts 29a, 29b, comprising posts and metal panels the lower ends of the panels having lower rollers 30 or other runner formations received in tracks 30a on the timber decking 22 and upper runner formations 30' received in upper tracks 30b of the roof frame 19, which tracks 30a, 30b extend longitudinally of the structure, and a rear door 31 pivoted for opening on one of the side parts 29a and which can be locked closed by lock L. The side parts 29a, 29b are held apart at the top ends thereof by a rectangular framework having an intermediate cross members 33.

In the present example the lateral dimensions of the pen are just sufficient to enable a cow of average dimensions to be received therein, when the rear door 31 of the advancing means is opened, but is somewhat longer than a cow. Of course if a similar structure is to be provided for restraining a larger or smaller animal such as a large cow, a sheep or horse, the lateral dimensions of the pen would need to be different to suit the type of animal concerned.

Adjacent the front end 14 of the structure, a further pair of tracks 34 are provided on the timber decking 22 which tracks 34 extend from the sides inwardly and forwardly, and nearly meet adjacent a longitudinal centre line of the structure. Mounted for movement in each of the tracks 34, is a closure member 35 which is pivoted at one side 36 adjacent the side 12 or 13, of the framework. Thus the closure members 35 may be pivoted between an open position as shown in FIG. 1, to a closed position guided by the tracks 34, wherein the closure members 35 engage a front part of an animal received in the pen such as the neck of the animal to restrain the front part, e.g. the head, from movement. Because the tracks 34 extend forwardly, and the closure members 35 are pivoted forwardly of the tracks 34, the closure members are closed around the animal from behind so that the animal does not see the members 35 closing and thereby does not become distressed.

By the time that the animal becomes aware of the closure members 35 being closed, its head is restrained by them in the manner of a yoke.

The advancing means are hydraulically powered, a hydraulic ram 40 acting between two lever members 41, 42, the member 41 being pivotally connected at one end to one of the intermediate cross members 33 of the advancing means. The other end of the lever member 41 is connected to the cylinder part 43a of the ram 40. One end 44 of the other lever member 42 is connected for pivotal movement, intermediate the ends of the lever member 41, whilst the other end thereof is connected to a fixed cross member 45 of the roof frame 19.

Piston part 43b of the ram 40 is connected intermediate the ends of the second lever member 42. Thus as the piston part 43b is retracted into the cylinder part 43a of the ram 40, the advancing means is moved forwardly in the structure guided by the tracks 30a, 30b, to urge an animal in the structure forwardly. The ram 40 is actuated in well known manner by a hydraulic fluid system controlled by a control valve 46 mounted on the roof frame 19 adjacent the front end 14 of the structure.

An upper end 50 of each side part of each of the closure members 35 is connected by a linkage mechanism to a further hydraulic ram 52, the cylinder part 53a of which is also connected to the fixed cross member 45 of the roof frame 19, whilst the piston part 53b is connected to the linkage mechanism. Thus as the ram 52 is extended from the cylinder part 53a, the closure members 35 are together pivoted to a closed position around the animal's neck for example, or another front part of the animal as required. Again, the ram 52 is actuated in well known manner by a hydraulic fluid system controlled by a control valve 55 mounted on the roof frame 19 adjacent the front 14 of the structure. The closure member 35 includes inclined wide bars 35a which are the parts which actually engage the animal.

In this example pressurised hydraulic fluid is provided from a reservoir R via a pump P of an external tractor unit illustrated diagrammatically at T and returned to the tractor unit via pressure hoses 56a which extend to a master valve 57 provided at the rear 15 of the pen 10 which master valve 57 controls the overall flow of fluid to each of the control valves 46, 55 via further hydraulic pressure hoses 56b. If required, the pen may be provided with its own hydraulic pressurising means, such as a pump, and hydraulic reservoir instead of utilizing the pressurising means of an external tractor unit T.

Operation of the pen 10 is as follows.

With the advancing means and yoke means in the position shown in FIGS. 1 and 2, the rear door 31 is opened to allow an animal to enter the pen 10 through the door opening at the rear 15 of the structure. The door 31 is then locked closed and the advancing means actuated by operating control valve 46, to urge the animal forwardly in the pen 10 until its neck is adjacent the front of the tracks 34.

The closure members 35 are then closed by operating valve 55 until the bars 35a of the closure members 35 engage the animal's neck closely. If necessary, the advancing means may be further advanced during its operation or thereafter, to provide further restraint.

Operations may then be carried out on the animal either through the openings in the upper part of the framework 11, or by opening one or more of the end or side doors 23, 25, 26.

In case it is desired, for example to lift the animal's leg in a sling so that an operation may be carried out on the hoof or foot of the animal, a manually operated lifting means 60 is provided comprising a rotational shaft 61 having a plurality of hooks 62 along its length.

A sling is secured to one of the hooks 62 and around the animal's leg, and the shaft 61 is rotated by means of a handle and ratchet mechanism 63 thereby wrapping the sling around the shaft 61 and lifting the animal's leg. This means 60 could be power assisted if required.

Of course if desired, means may be provided to lift the entire animal which could be achieved by a hydraulic power means or a manual means as required.

Of course, many modifications may be made to the pen described without departing from the scope of the invention. For example, instead of the particular configuration of hydraulic power means described, other configurations are possible. For example, instead of the single hydraulic ram 52 to actuate the closure members 35 via the linkage mechanism, a pair of hydraulic rams may be provided if required. The structure and size of the pen may be modified as required to suit a particular animal, or for a particular operation to be carried out on an animal, e.g. the metal panels 27 may be omitted and/or additional framework members may be provided.

. The advancing means and/or closure members 35 need not run in tracks 30a, 30b, 34, but may be connected for movement in any other desired manner as required.

If it is desired that the pen be transportable, the pen 10 may be mounted on a wheel structure which could be adapted to permit the pen to be lowered to the ground so that there is no step for the animal to enter the pen.

I claim:

1. An animal pen comprising a plurality of main frame members interconnected to provide an animal receiving structure having a front end and a rear end, door means adjacent the rear end of the structure for entry of the animal head first into the pen, an advancing means including said rear door means, mounted on the main frame for movement forwardly of the frame, to engage the rear of the animal to urge the animal forwardly in the structure, a first hydraulic ram means to actuate the advancing means, said first ram means comprising a cylinder part and a piston part, one of said cylinder and piston parts being connected to the advancing means and the other of said cylinder and piston parts being connected to the main frame, a yoke means comprising a pair of closure members mounted in the frame for movement forwardly and inwardly of the frame to close around a front part of the animal, a linkage mechanism connected to the closure members, a second hydraulic ram means to actuate the yoke means, said second ram means comprising a cylinder part and a piston part, one of said cylinder and piston parts being connected to the linkage mechanism and the other of said cylinder and piston parts being connected to the main frame.

2. A pen according to claim 1 wherein the animal receiving structure comprises a plurality of openings between the frame members through which an operation may be carried out on an animal received in the pen.

3. A pen according to claim 1 wherein the closure members of said yoke means are carried on tracks within the structure, the tracks extending inwardly and forwardly of the structure so that when the second hydraulic ram means is actuated, the closure members are constrained to move by the tracks in a direction inwardly and towards the front end of the structure to close around a front part of the animal.

4. A pen according to claim 1 wherein the structure has one or more side doors openable to enable an operation to be carried out on an animal.

5. A pen according to claim 1 wherein the pen has means to lift an animal or a part of the animal in the structure.

6. A method of restraining an animal using an animal pen comprising a plurality of main frame members interconnected to provide an animal receiving structure having a front end and a rear end, door means adjacent the rear end of the structure for entry of the animal head first into the pen, an advancing means including said rear door means, mounted on the main frame for movement forwardly of the frame, to engage the rear of the animal to urge the animal forwardly in the structure, a first hydraulic ram means to actuate the advancing means, said first ram means comprising a cylinder part and a piston part, one of said cylinder and piston parts being connected to the advancing means and the other of said cylinder and piston parts being connected to the main frame, a yoke means comprising a pair of closure members mounted in the frame for movement forwardly and inwardly of the frame, to close around a front part of the animal, a linkage mechanism connected to the closure members, second hydraulic ram means to acutate the yoke means, said second ram means comprising a cylinder part and a piston part, one of said cylinder and piston parts being connected to the linkage mechanism and the other of said cylinder and piston parts being connected to the main frame, said method comprising the steps of causing an animal to enter the pen through the rear door means thereof, actuating the advancing means to urge the animal forwardly in the structure, actuating the yoke means to close around the front part of the animal.

* * * * *